United States Patent [19]
Nagasaki et al.

[11] Patent Number: 5,153,730
[45] Date of Patent: Oct. 6, 1992

[54] ELECTRONIC STILL CAMERA HAVING TWO RECORDING STAGES FOR RECORDING STILL-IMAGE SIGNALS

[75] Inventors: Tatsuo Nagasaki, Yokohama; Hidetoshi Yamada, Tokyo, both of Japan

[73] Assignee: Olympus Optical Co., Ltd., Tokyo, Japan

[21] Appl. No.: 551,560

[22] Filed: Jul. 11, 1990

[30] Foreign Application Priority Data

Jul. 27, 1989 [JP] Japan ................... 1-195311

[51] Int. Cl.$^5$ ............................................. H04N 5/30
[52] U.S. Cl. ................................ 358/209; 358/909; 358/335; 360/35.1
[58] Field of Search ............... 358/209, 44, 909, 335, 358/342, 433; 360/35.1, 5

[56] References Cited

U.S. PATENT DOCUMENTS

| | | | |
|---|---|---|---|
| 4,281,354 | 7/1981 | Conte | 360/5 |
| 4,641,215 | 2/1987 | Katoh et al. | 360/35.1 |
| 4,651,227 | 3/1987 | Yunoki et al. | 360/35.1 |
| 4,748,511 | 6/1988 | Nichols et al. | 358/433 |
| 4,794,468 | 12/1988 | Murakoshi | 358/209 |
| 4,802,017 | 1/1989 | Takahashi et al. | 360/35.1 |
| 4,837,628 | 6/1989 | Sasaki | 358/209 |
| 4,845,571 | 7/1989 | Hirano et al. | 360/35.1 |
| 4,974,111 | 11/1990 | Platte et al. | 360/35.1 |

OTHER PUBLICATIONS

Modestino et al. "Performance of Block Cosine Image Coding", IEEE Transactions on Communications, vol. COM-33, No. 3, Mar. 1985, pp. 210-217.

Chen and Smith "Adaptive Coding of Monochrome and Color Images", IEEE Transactions on Communications, vol. COM-25, No. 11, Nov. 1977, pp. 1285-1292.

Primary Examiner—Tommy P. Chin
Assistant Examiner—Glenton B. Burgess
Attorney, Agent, or Firm—Frishauf, Holtz, Goodman & Woodward

[57] ABSTRACT

An electronic still camera comprising an image-pickup section, and A/D conversion section, a primary recording section, a secondary recording section, a control section, and an image-signal processing section. The image-pickup section generates still-image signals. The A/D conversion section converts the still-image signals into digital signals. The primary recording section records the digital signals. The control section reads the digital signals recorded by the primary recording section, at least during non-operating period of the image-pickup section. The image-signal processing section performs predetermined processing on the digital signals read by the control section, thereby outputting data. The predetermined processing includes at least data compression. The secondary recording section records the data output by the image-signal processing section.

13 Claims, 7 Drawing Sheets

ELECTRONIC STILL CAMERA HAVING TWO RECORDING STAGES FOR RECORDING STILL-IMAGE SIGNALS

BACKGROUND OF THE INVENTION

1. Field of the Invention

The present invention relates to an electronic still camera and, more particularly, to an electronic still camera for recording digital still-image signals generated by an image pickup device such as a charged coupled device (CCD), in a recording medium such as a so-called "memory card" containing a semiconductor memory or the like.

2. Description of the Related Art

Thanks to recent advances made in semiconductor devices and digital-signal processing technology, various types of electronic still cameras have been developed which record still-image signals generated by a solid-state image-pickup device such as a CCD, in a socalled memory card which contains a semiconductor memory. The still-image signals recorded in the memory card are supplied to an image-reproducing apparatus such as a TV receiver, which reproduces an image from these signals.

The memory card has but a limited storage capacity, and the still-image signals generated by the image-pickup device are subjected to a signal-processing, such as luminance/chrominance (Y-C) separation, and then to data compression, before they are recorded in the memory card.

Figure 8:
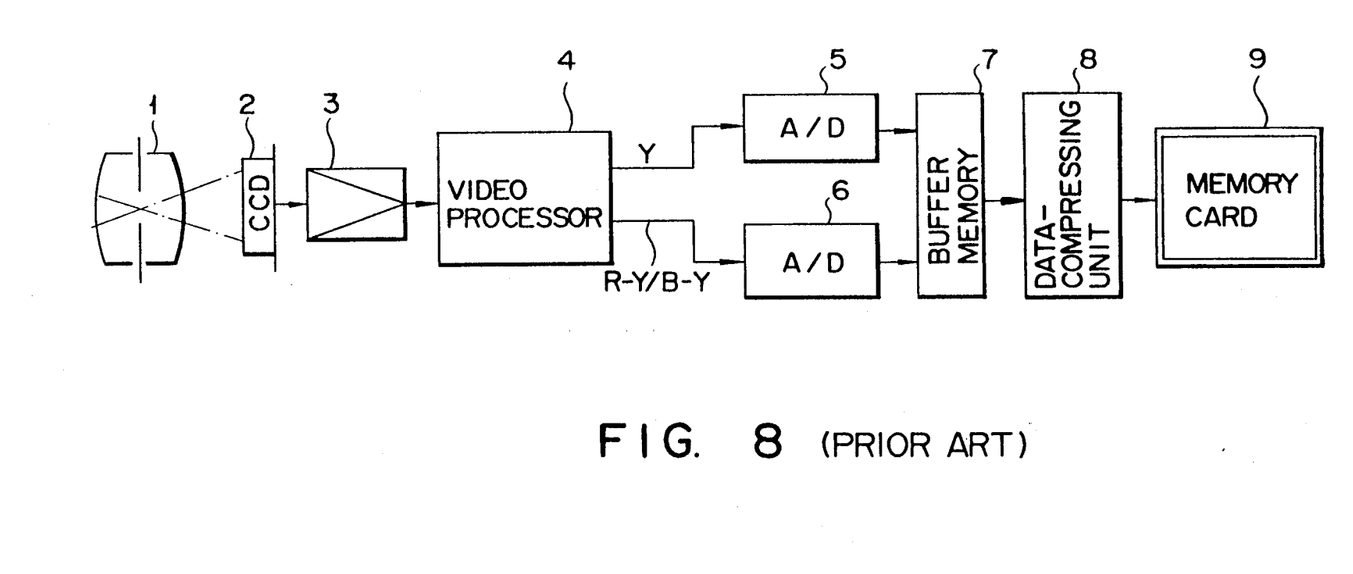
FIG. 8 is a block diagram illustrating a conventional electronic still camera.

FIG. 8 is a schematic block diagram illustrating a conventional electronic still camera of the type described above. As is shown in FIG. 8, the camera comprises an optical lens system 1 having an aperture diaphragm, a CCD 2, an amplifier 3, a video processor 4, two A/D converters 5 and 6, a buffer memory 7, a data compressing unit 8, and a memory card 9. The light reflected from an object passes through the lens system 1 and is applied to the CCD 2. The CCD 2 converts the light into still-image signals. These signals are amplified by the amplifier 3 and input to the video processor 4. The video processor 4 performs Y-C separation on the input signals. More precisely, the processor 4 separates each signal into a luminance signal and a chrominance signal. The luminance signals are supplied to the A/D converter 5 and converted into digital luminance signals, whereas the chrominance signals are supplied to the A/D converter 6 and converted into digital chrominance signals. The digital signals output by these A/D converters 5 and 6 are stored into the buffer memory 7. Y-C signals, each composed of a luminance signal and a chrominance signal, are read from the buffer memory 7, and are input to the data-compressing unit 8. The unit 8 compresses the Y-C signals, and the compressed Y-C signals are recorded in the memory card 9.

The video processor 4 requires a long time to separate the signals output from the CCD 2 into a luminance signal and a chrominance signal. The A/D converters 5 and 6 also require much time to convert the luminance and chrominance signals into digital signals, and the data-compressing unit 8 also requires much more time to compress the Y-C signals. Consequently, a considerably long period of time passes from the time the CCD converts the light into still-image signals to the time Y-C signals are recorded in the memory card 9. This period is particularly long when the data compressing unit 8 is of the type which performs a high level data compression such as adaptive discrete cosine transform (ADCT), thereby to generate high-quality image signals. The buffer memory 7 needs to keep storing the still-image signals (more precisely, the luminance signals and the chrominance signals) for a greater part of this long period. Hence, the buffer memory 7 must have a great storage capacity in order to enable the user of the electronic still camera to take many pictures of an object at short intervals.

To shorten the time required to process the still-image signals output by the CCD 2 into Y-C signals which can be recorded in the memory card 9, the camera needs to have a very complex hardware configuration, and must inevitably be very large and expensive.

SUMMARY OF THE INVENTION

It is, therefore, an object of the present invention to provide a new and improved electronic still camera which has a primary stage and a secondary stage, for recording still-image signals and image data, respectively, which has a relatively simple hardware configuration that can, never the less, record high-quality image data in a recording medium such as a memory card, and which enables a user to take many pictures at short intervals.

According to a first aspect of the invention, there is provided an electronic still camera comprising:

image-pickup means for generating still-image signals;

A/D conversion means for converting the still-image signals generated by the image-pickup means, into digital signals;

primary recording means for recording the digital signals output by the A/D conversion means;

control means for reading the digital signals recorded by the primary recording means, at least during non-operating period of the image-pickup means;

image-signal processing means for performing predetermined processing on the digital signals read by the control means, thereby outputting data, the processing including at least data compression; and secondary recording means for recording the data output by the image-signal processing means.

According to a second aspect of the invention, there is provided an electronic still camera which comprises the same components as the camera according to the first aspect of the invention, and, in addition, a bus connecting the primary and secondary recording means, so that the digital signals are transferred between the primary and secondary recording means via the common bus line, and which is, hence, has a relatively simple hardware configuration and can yet perform various functions at high efficiency.

The image-pickup means, which may be a CCD, generates still-image signals representing a still image of an object. The A/D conversion means converts these signals into digital signals, and the primary recording means records the digital signals. During non-operating period of the image-pickup means, the digital signals are read from the primary recording means, the image-signal processing means performs processing, including at least data compression, thereby generating data, and the secondary recording means records this data.

Every time the user takes a picture the image-pickup means generates still-image signals, the A/D conversion means converts these signals into digital signals, and the primary recording means records the digital signals.

While the user takes no pictures, that is, during non-operating of the image-pickup means, the control means reads the digital signals from the primary recording means, and the image-signal processing means processes the digital signals, converting them into image data, and the secondary recording means records this image data. Since the digital signals are read from the primary recording means during non-operating of the image-pickup means, the primary recording means need not have a great storage capacity to enable the user to take many pictures at short intervals. Further, since the non-operating period of the image-pickup means is long enough for the the data-processing unit to perform a high-level data compression, the data-processing means can be simple in structure and can yet produce high-quality image data with high efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Reference will now be made in detail to the presently preferred embodiments of the invention as illustrated in the accompanying drawings, in which like reference characters designate like or corresponding parts throughout the several drawings.

An electronic still camera according to a first embodiment of the invention will now be described with reference to FIG. 1.

Figure 1:
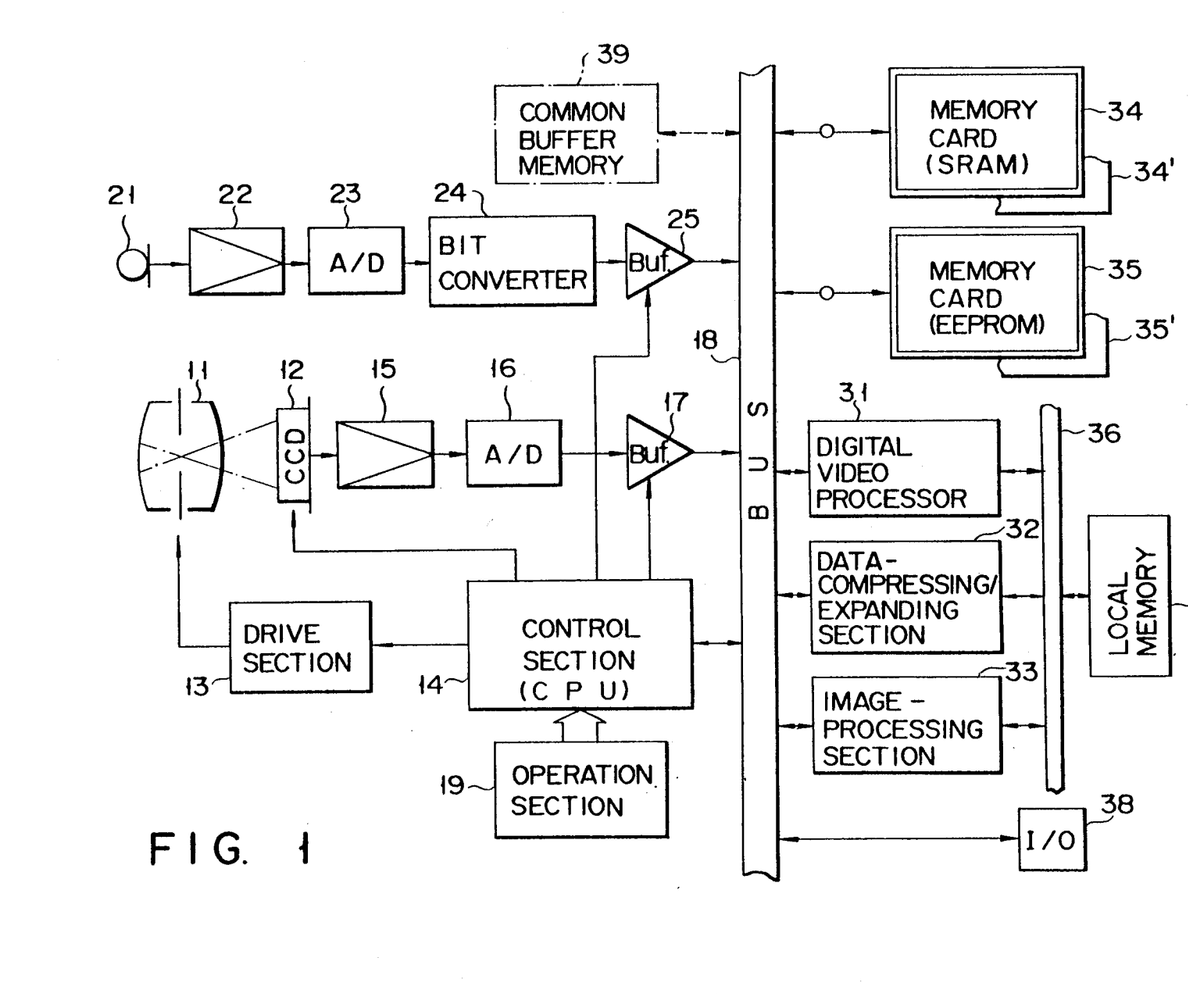
FIG. 1 is a block diagram schematically showing the major components of an electronic still camera according to a first embodiment of the present invention.

As is shown in FIG. 1, the electronic still camera comprises an optical lens system 11, a CCD 12 (i.e., a solid-state image-pickup device), a drive section 13 connected to the optical lens system 11, a control section 14 connected to the drive section 13 and the CCD 12, and an operation section 19 connected to the control section 14. The system 11 has an aperture shutter (not shown) that forms an image of an object on the image-forming surface of the CCD 12. The control section 14 controls the drive section 13. Under the control of the section 14, the drive section 13 drives the optical lens system 11, such that the system 11 controls the focusing of the image and the amount of light applied to the CCD 12. The method of driving the optical lens system 11, which is not a feature of the present invention, can be the same as is employed in the conventional electronic still camera.

The CCD 12 has a red filter, a green filter, and a blue filter which are provided on the image-pickup surface thereof. In response to an image-pickup command input by operating the operation section 19 and supplied from the control section 14, the CCD 12 generates three electrical charges for each of the pixels forming the image on the image-forming surface, which corresponds to the amounts of light passing through the red, green, and blue filters, respectively. The electrical charges are converted to voltage signals, which are subjected to line-transfer control or frame-transfer control, and converted into still-image signals. The still-image signals, thus obtained, are output from the CCD 12.

As is shown in FIG. 1, the electronic still camera further comprises a preamplifier 15 connected to the output of the CCD 12, an A/D converter 16 coupled to the output of the preamplifier 15, a gate circuit 17 connected to the output of the A/D converter 16, and a common bus line 18 to which the circuit 17 is connected. The preamplifier 15 amplifies the still-image signals to so high a level that the signals can be processed further. The A/D converter 16 converts the amplified still-image signals to, for example, 8-bit digital red-image signal, green-image signals and blue-image signals. The gate circuit 17, which is a three-state buffer, controls these digital image signals, and then supplies them to the common bus line 18 at the specific timing determined by the control signal supplied from the control section 14.

As is illustrated in FIG. 1, too, the electronic still camera further comprises a microphone 21, a preamplifier 22 coupled to the output of the microphone 21, an A/D converter 23 connected to the output of the preamplifier 22, a bit converter 24 connected to the output of the A/D converter 23, and a gate circuit 25 connected between the output of the bit converter 24 and the common bus line 18. The microphone 21 catches the sound or speech made by the object, the speech made of the photographer, or the sound or speech made by anything surrounding the camera, and converts the sound or speech into audio signals. The preamplifier 22 amplifies the audio signals amplifies the audio signals to so high a level that the signals can be processed further. The A/D converter 23 converts the amplified audio signals to digital audio signals. The bit converter 24 converts the digital audio signals, which form parallel data, into a series of audio signals. The gate circuit 25, which is similar to the gate circuit 17, controls the audio signals and supplies them to the common bus line 18.

The control section 14 controls the gate circuits 17 and 25 such that the digital audio signals are supplied to the common bus line 18 with a time lag with respect to the digital image signals supplied to the common bus line 18. Hence, frame-data items, each consisting of image signals and audio signals, are sequentially supplied through the common bus line 18 to a memory card 34, as will be described later in detail.

The electronic still camera is characterized in two respects. First, a digital video processor 31, a data-compressing/expanding section 32, and an image processing section 33 are connected to the common bus line 18. Second, memory cards 34 and 35, for storing digital still-image signals, are removably connected to the common bus line 18.

The video processor 31, the data-compressing/expanding section 32, the image-processing section 33, and the memory cards 34 and 35 are controlled by the signals supplied from the control section 14 though the common bus line 18, whereby the still-image signals are supplied through the common bus line 18. As a result, the still-image signals are transferred among the processor 31, the section 32, the section 33, and memory cards 34 and 35.

The memory card 34 has, as its major component, a static random access memory (SRAM) which has a storage capacity of about 2 megabytes and which can be accessed at high speed. The card 34 is used as buffer memory for storing digital still image signals, as will be described later. Another memory card 34' may be set in the electronic still camera, if necessary, along with the memory card 34.

The memory card 35 has, as its major component, an electrically erasable programmable read-only memory (EEPROM), and is used to store still-image signals. Also, the memory card 35 may be used to store photographing control data or data for controlling processing of the image signals. The memory card 35 may be replaced by a processor 35' which is designed in the form of a card.

As is evident from FIG. 1, the data-compressing/expanding section 32 and the image-processing section 33 are connected not only to the data line 18, but also to a local bus line 36. A local memory 37 is connected to the local bus line 36. The data output from the the sections 32 and 33 can, thus, be supplied via the local bus line 36 and stored into the local memory 37, and the data stored in the memory 37 can be supplied to the sections 32 and 33. Hence, these components 32 and 33 can operate independently of the other components which are also connected to the common bus line 18.

It should be noted that the control section 14 comprises a CPU and some peripheral circuits, and is customized to some of the other components of the electronic still camera, including the various circuits for processing signals.

A common buffer 39 is connected to the common bus line 18, if necessary. This buffer 39 has a storage capacity large enough to store one frame of an image.

The operation of the electronic still camera, which has been described above, will now be explained.

First, the operation section 19, which has various switches including a single-picture mode switch, a continuous photographing mode switch, and a shutter releasing switch, supplies an image-pickup command when it is operated by a user. This command is supplied to the control section 14. Then, the control section 14 supplies control signals to the drive section 13 when the user pushes the shutter-releasing switch lightly, thus performing so-called "pre-releasing." In accordance with the control signals, the section 13 drives the optical lens system 11. Driven by the section 13, the optical lens system 11 controls the focusing of the image and the amount of light applied to the CCD 12. When the user pushes the shutter-releasing switch completely to release the shutter of the camera, the control section 14 supplies an image-pickup command to the CCD 12. In response to this command, the CCD 12 picks up one image if the the user has pushed the single-picture mode switch, or a plurality of images one after another at predetermined intervals if the user has pushed the continuous photographing mode switch. As a result, the CCD 12 generates still-image signals from the light applied to its image-forming surface through the optical lens system 11.

At the same time the section 14 supplies the image pickup command to the CCD 12, it opens the gate circuit 17. The digital image signals which the A/D converter 16 has generated from the still-image signals output by the CCD 12 and amplified by the amplifier 15, are therefore supplied to the common bus line 18 via the gate circuit 17. The control section 14 also accesses the memory card 34, whereby the digital image signals are sequentially stored into the memory card 34.

The still image signals generated by the CCD 12 are converted into digital image signals through the amplifier 15. The digital image signals are not processed at all (not compressed) before they are supplied to the common bus line 18, and are then stored at high speed into the memory card 34 every time the user pushes the shutter-releasing switch after he or she has pushed the single-picture mode switch, or as long as the user depresses the shutter-releasing switch after he or she has pushed the continuous photographing mode switch.

To input an oral message about the picture or pictures being taken, the user operates the operation section 19, causing the control section 14 to open the gate circuits 17 and 25 alternately and repeated, in time sharing fashion. In this case, the digital image signals and the digital audio signals generated by the bit converter 24 are alternately stored into the memory card 34.

When all digital image signals defining a picture or pictures taken by the CCD 12 are stored into the memory card 34, the electronic still camera goes into a non-photographing condition. Then, the control section 14 starts retrieving the data stored in the memory card 34, thereby determining whether or not there are any signals, among the still-image signals stored in the card 34, that have not been processed into an appropriate image signal. If such a signal, which is similar to one generated by the CCD 12, is found among the still-image signals, the control section 14 reads this signal from the memory card 34 and supplies it to the digital video processor 31 through the common bus line 18, while the camera remains in the non-photographing condition. The processor 31 performs Y-C separation, filtering, and the like, on the signal read from the memory card 34 and supplied to it through the common bus line 18, thus converting this signal into an appropriate digital image signal. The digital image signal, thus produced by the digital video processor 31, is transferred to the data compressing/expanding section 32. The section 32 compresses the digital image signal by means of, for example, ADCT. If necessary the digital signal is transferred from the processor 31 to the image-processing section 33 before being supplied to the section 32, in which case the section 33 processes this signal into a still-image signal not distorted or having any other defect.

It should be noted that the data-compressing/expanding section 32 expands the image data stored in the memory card 34 before this data is supplied to a TV receiver (not shown), thereby to reproduce the picture or pictures by means of the television receiver.

The processor 31, the section 32, and the section 33 process the defective image signals found among the signals stored in the memory card 34, while the electronic still camera remains in non-photographing condition. The period during which the the camera remains in this condition is sufficiently long, so that the image signals can be processed with high accuracy into flawless still-image signals.

The image signals generated by the digital video processor 31, the data-compressing/expanding section 32, or the image-processing section 33, are supplied to the memory card 34 via the common bus line 18 and stored into the memory cared 34, under the control of the control section 14. Then, the control section 14 erases the image signals which have been found defective, thereby making some memory locations of the card 34 vacant. These memory locations made vacant function as a buffer for storing the still-image signals which the memory card 34 may store the still-image signals which the A/D converter 16 will generate during the next photographing operation.

The still-image signals, which the processor 31, the section 32, or the section 33 have generated by processing the image signals read from the memory card 34, may not be stored into the memory card 34, but into the memory card 35 which has a greater storage capacity though operating at a lower speed than the memory card 35. If necessary, the common buffer memory 39 may be used as a buffer memory while the digital video processor 31, the data-compressing/expanding section 32, and the image-processing section 33 are performing their respective functions.

As has been described, the memory card 34, i.e., the recording medium, functions as a buffer memory to store still-image signals in real time. That is, as the A/D converter 16 generates these signals from the signals output by the CCD 12, some of the signals which are found defective are read from the memory card 34 subjected to a processing such as data compression while the camera remains in non-photographing condition, and the signals thus processed are stored into the memory card 34 or the memory card 35 also while the camera remains in non-photographing condition. Therefore, the signals read from the memory card 35 need not be processed at high speed. Further, since the memory card 34 is used as a buffer memory for storing image signals which need to be processed, the electronic still camera requires no large-capacity memories. The camera can have hardware configuration much simpler than that of the conventional electronic still camera.

Moreover, since the period during which the camera remains in non-photographing condition is relatively long, the processor 31, the section 32, and the section 33 can perform high-level processing, such as data compression, on the signals read from the memory card 34, thus forming high-quality image signals, in spite of their simple structures. In other words, these components 31, 32, and 33, though simple in structure, can produce high-quality image signals which will be stored into either the memory card 34 or the memory card 35.

In the electronic still camera described above, the digital signals, which represent a plurality of pictures the user has continuously taken and which have been sequentially stored into the memory card 34, can be read from the memory card 34, subjected to high-level processing, and stored into the memory card 34 or 35 -- while the camera remains in non-photographing condition. Hence, the camera can record high-quality image signals, also when it is set to the continuous photographing mode.

As has been described, it is through the common bus line 18 that the signals read from the memory card 34 are supplied to the processor 31, the section 32, or the section 33 to be further processed. Hence, to subject the signals read from the memory card 34 to a specific high-level processing other than those which the components 31, 32, and 33 perform, it suffices to attach an image processor capable of performing this specific processing to the camera and electrically connect it to the common bus line 18.

Figure 2:
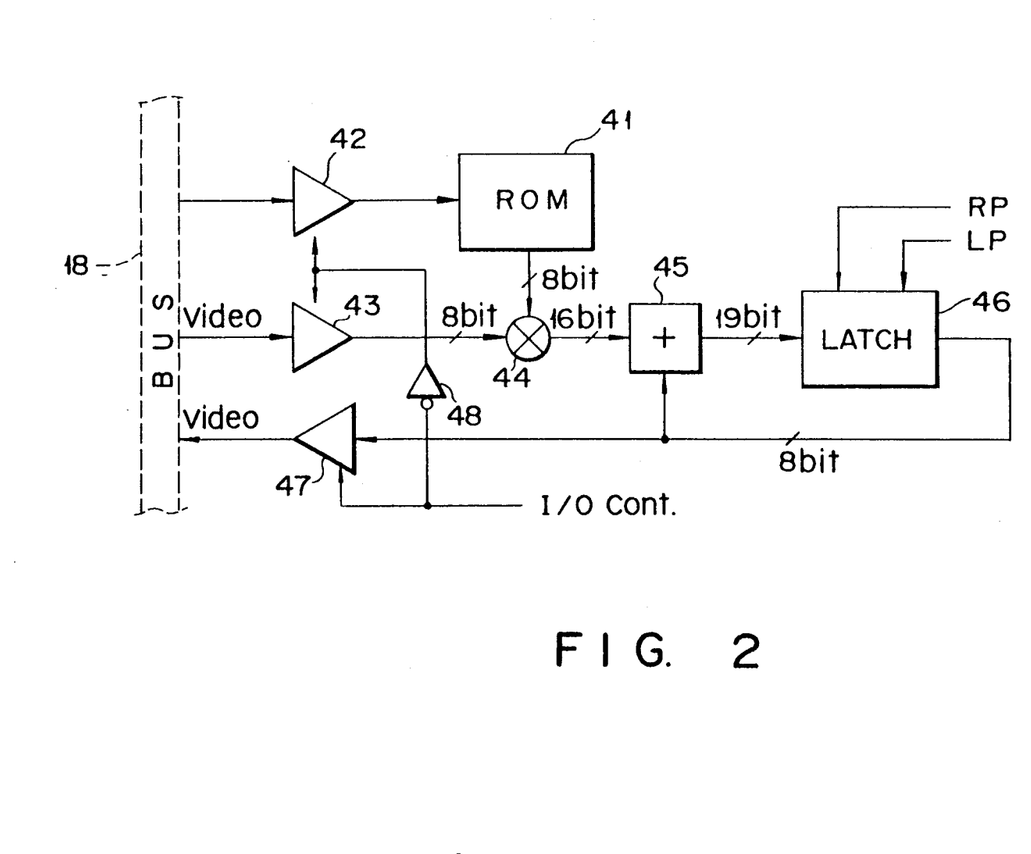
FIG. 2 is a block diagram illustrating the digital video processor incorporated in the camera shown in FIG. 1.

The digital video processor 31 can be of such a simple hardware configuration as is illustrated in FIG. 2. The digital video processor shown in FIG. 2 comprises a ROM 41, gate circuits 42 and 43, a multiplier 44, an adder 45, a latch circuit 46, a gate circuit 47, and an inverter circuit 48.

The ROM 41 stores various coefficients required for processing image signals. An access signal is supplied from the common bus line 18 to the ROM 41 through the gate circuit 42, whereby one of the coefficients is read from the ROM 41 and supplied to the multiplier 44. At the same time, an image signal, which needs to be processed further, is supplied to the multiplier 44. The multiplier 44 multiplies the image signal by the coefficient, thus obtaining the product thereof. This product is input to the adder 45.

The adder 45 adds the output of the multiplier 44 and the output of the latch circuit 46. The latch circuit 46 latches the data output by the adder 45 upon receipt of a latch pulse LP, and feeds this data back to the adder 45. The adder 45 adds this data to the data newly output from the multiplier 44 and supply the sum of these data items to the latch circuit 46, and the latch circuit circuit 46 latches the sum obtained by the adder 45. The adder 45 and the latch circuit 46 repeat their respective operations up until a reset pulse RP is supplied to the latch circuit 47, thus resetting the circuit 47.

The image signals, thus processed and accumulated in the latch circuit 46, are supplied from the latch circuit 46 to the common bus line 18 through the gate circuit 47, and are stored into either the memory card 34 or the memory card 35.

An input/output control signal I/O Cont is supplied to the gate circuit 47 and also to the inverter circuit 48. The circuit 48 inverts the signal I/O Cont, and its output is supplied to the gate circuits 42 and 43. Therefore the gate circuits 42 and 43, on the one hand, and the gate circuit 47, on the other, are alternately opened.

The processing of image signals, performed by the digital video processor 31, will be explained in a little more detail. The processor 31 is designed to perform various functions: (i) to produce a luminance signal Y from the color component of each image signal generated by the CCD 12, stored in the memory card 34, and representing the n-th pixel of the image on the image-forming surface of the CCD 12; (ii) to produce a color-difference signal (R-Y/B-Y), and (iii) to filter the color-difference signal (R-Y/B-Y).

Figure 3:
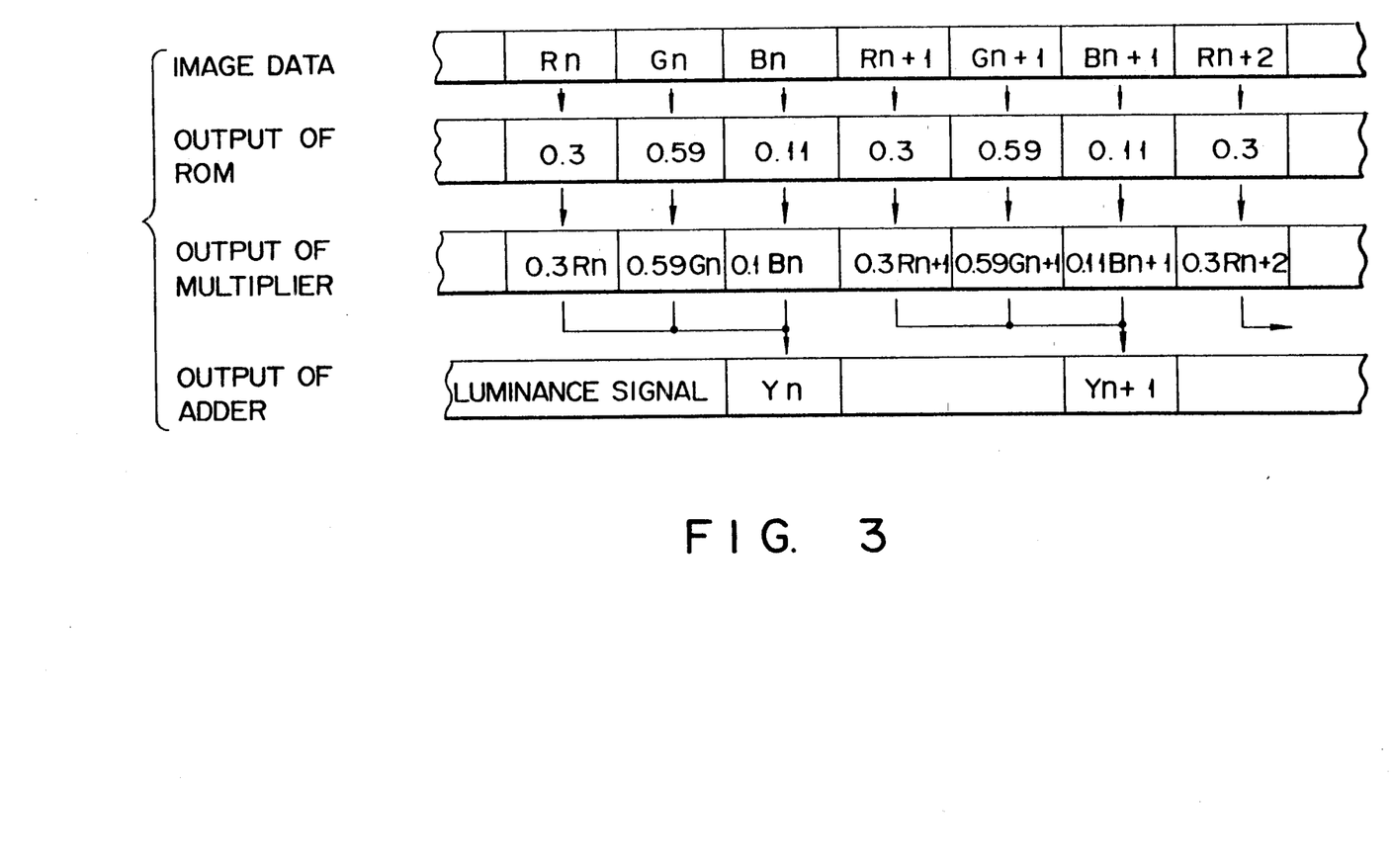
FIGS. 3 to 5 and FIGS. 6A and 6B are diagrams schematically represent the various signals output by the components of the processor shown in FIG. 2.

FIG. 3 is a diagram explaining how the digital video processor 31 produces a luminance signal Y from the color component of each image signal. In FIG. 3, Rn, Gn, and Bn designate the the red component, green component and blue component of the n-th still-image signal the CCD 12 has generated. These color components Rn, Gn, and Bn are sequentially supplied from the memory card 34 to the multiplier 44 through the common bus line 18 and the gate circuit 43. In synchronism with the supply of the color components Rn, Gn, and Bn, three access signals are supplied to the multiplier 44 through the common bus line 18 and the gate circuit 42. Hence, three coefficients [0.30], [0.59], and [0.11] for the three color components Rn, Gn and Bn of the n-th still-image signal are read from the ROM 41 to the multiplier 44. The multiplier 44 multiplies the red component Rn by [0.30], the green component Gn by [0.59], and the blue component Bn by [0.11]. The adder 45 and the latch circuit 46 cooperate, thereby adding the three products of multiplication, i.e., 0.30Rn, 0.59Gn, and 0.11Bn and forming a luminance signal Yn for the n-th image signal (i.e., the n-th pixel of the image), which is given as:

$$Yn = 0.30Rn + 0.59Gn + 0.11Bn$$

The digital video processor 31 operates as described in the preceding paragraph, producing the luminance signals Y from the still-image signals (i.e., pixels) which have been read from the memory card 34. The luminance signals Y, thus produced, are supplied from the processor 31 via the common bus line 18 and stored into the memory card 34. Hence, the luminance Y of each of the pixels forming the image is stored in the memory card 34.

Figure 4:
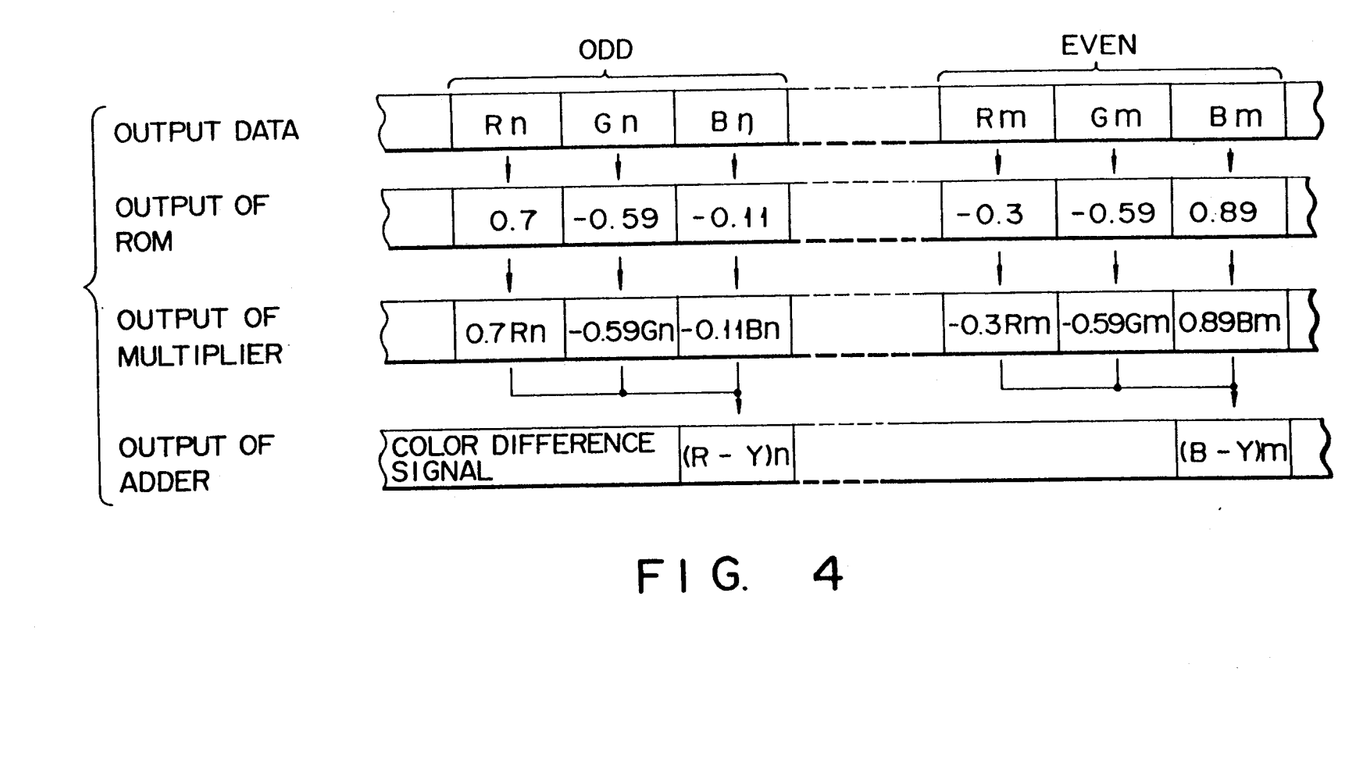

FIG. 4 is a diagram explaining how the digital video processor 31 produces a color-difference signal (R-Y/B-Y) from each still-image signal (i.e., each pixel of the image formed on the image-forming surface of the CCD 12). Two sets of coefficients, the first consisting of [0.70], [−0.59] and [−0.11], and the second consisting of [−0.30], [−0.59] and [0.89], are alternately read from the ROM 41, each set for each line of the still image formed on the image-forming surface of the CCD 12. The multiplier 44 multiplies the color components Rn, Gn and Bn of each image signal forming any even-numbered line of the image by coefficients [0 70], [−0.59] and 4[−0.11], and the adder 45 and the latch circuit 46 add the three products of the multiplication, thereby obtaining the following signal:

$$R - Y = 0.70R - 0.59Gn - 0.11Bn$$

Also, the multiplier 44 multiplies the color components Rn, Gn and Bn of each image signal forming any odd-numbered line of the image by coefficients [−0.30], [−0.59] and [0.89], and the adder 45 and the latch circuit 46 add the three products of the multiplication, obtaining the following signal:

$$B - Y = 0.70OR - 0.59Gn - 0.11Bn$$

The signals R-Y and B-Y, thus obtained are processed, forming a color-difference signal (R-Y/B-Y) for every two adjacent lines of the image formed on the surface of the CCD 12. The color-difference signal is supplied from the digital video processor 31.

Figure 5:
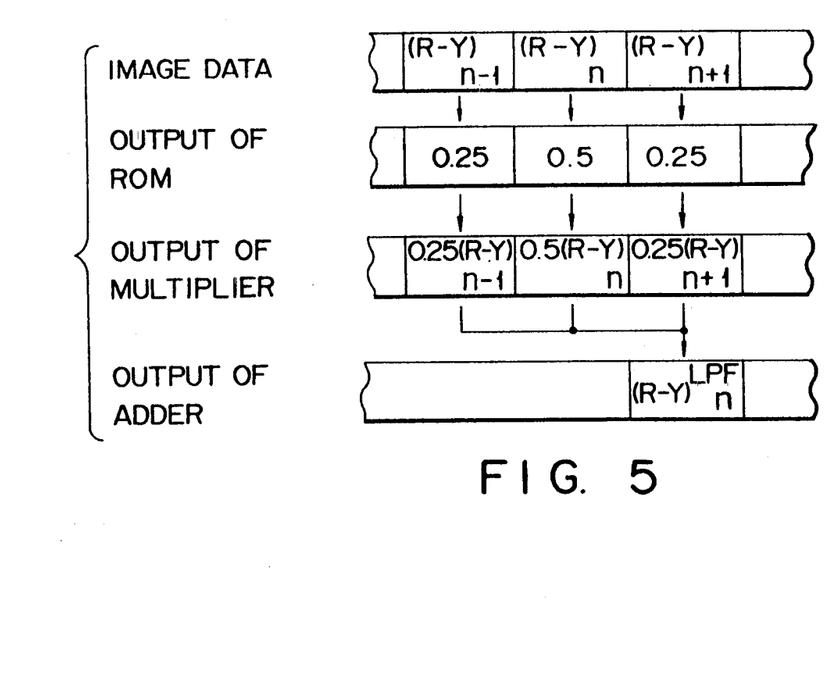
Figure 6A:
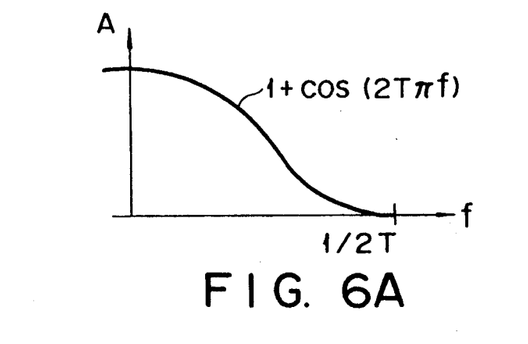
Figure 6B:
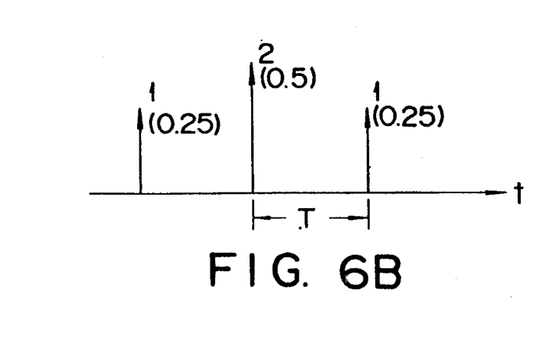

With reference to FIG. 5 and FIGS. 6A and 6B, it will be explained how the digital video processor 31 filters the color-difference signal (R-Y/B-Y). When filtering coefficient for the signal (R-Y/B-Y) is $[1 + \cos(2T\pi f)]$ as is shown in FIG. 6A, the digital filter for filtering the signal (R-Y/R-Y) are given a tap coefficient [0.50] for the pixel of interest, a tap coefficient [0.25] for the immediately preceding pixel, and a coefficient [0.25] for the immediately succeeding pixel, as is illustrated in FIG. 6B. The three tap coefficients are repeatedly read from the ROM 41 and repeatedly supplied to the multiplier 44. The multiplier 44 multiplies the color-difference signals (R-Y/B-Y) of the three adjacent pixels by [0.25], [0.50] and [0.25], respectively, thus generating 0.25(R-Y), 0.5(R-Y), and 0.25(R-Y), as can be understood from FIG. 5. Hence, the color-difference signals (R-Y/B-Y) of the adjacent three pixels are filtered with high efficiency, into a band-compressed color-difference signal signal (R-Y/B-Y).

As has been described in detail, the digital video processor 31 processes each image signal read from the memory card 34 and representing the color of one of the pixels forming the image focused on the image-forming surface of the CCD 12, into a new still-image signal consisting of a luminance signal Y and a color-difference signal (R-Y/B-Y). The new still-image signals for each frame of the image are stored into the memory card 34, together with audio signals, if any.

As may be understood from the explanation made above with reference to FIGS. 3, 4 and 5 and FIGS. 6A and 6B, the digital video processor 31 can process still-image signals in various ways with high efficiency, though its hardware configuration is very simple. It is true that the processor 31 requires rather a long time to multiply the image signals input to it sequentially, by coefficients, and to add the products of the multiplication. However, the processor 31 processes the signals while the electronic still camera remains in non-photographing condition. Hence, the common buffer memory 39 need not have a great storage capacity.

It is also during the non-photographing period that the data-compressing/expanding section 32 and the image processing section 33 process the still-image signals read from the memory card 34. In other words, the sections 32 and 33 process the signals while the CCD 12 is producing no image signals. Hence, these sections 32 and 33 can also perform high-level data-processing, such as ADCT, on the still-image signals read from the memory card 34.

As has been described with reference to FIG. 1, the digital video processor 31, the data-compressing/expanding section 32, and the image-processing section 33 are connected not only to the data line 18, but also to a local bus line 36. Hence, the sections 32 and 33 can operate independently of the other components which are connected to the common bus line 18, transferring data among them through the local bus line 36, while other data is being transferred among the other components through the common bus line 18. This means a reduction of the time during which the common bus line 18 is occupied, and thus a reduction of the time during which the image signals are processed. Hence, the electronic still camera, as a whole, can process image signals at high speed.

Figure 7:
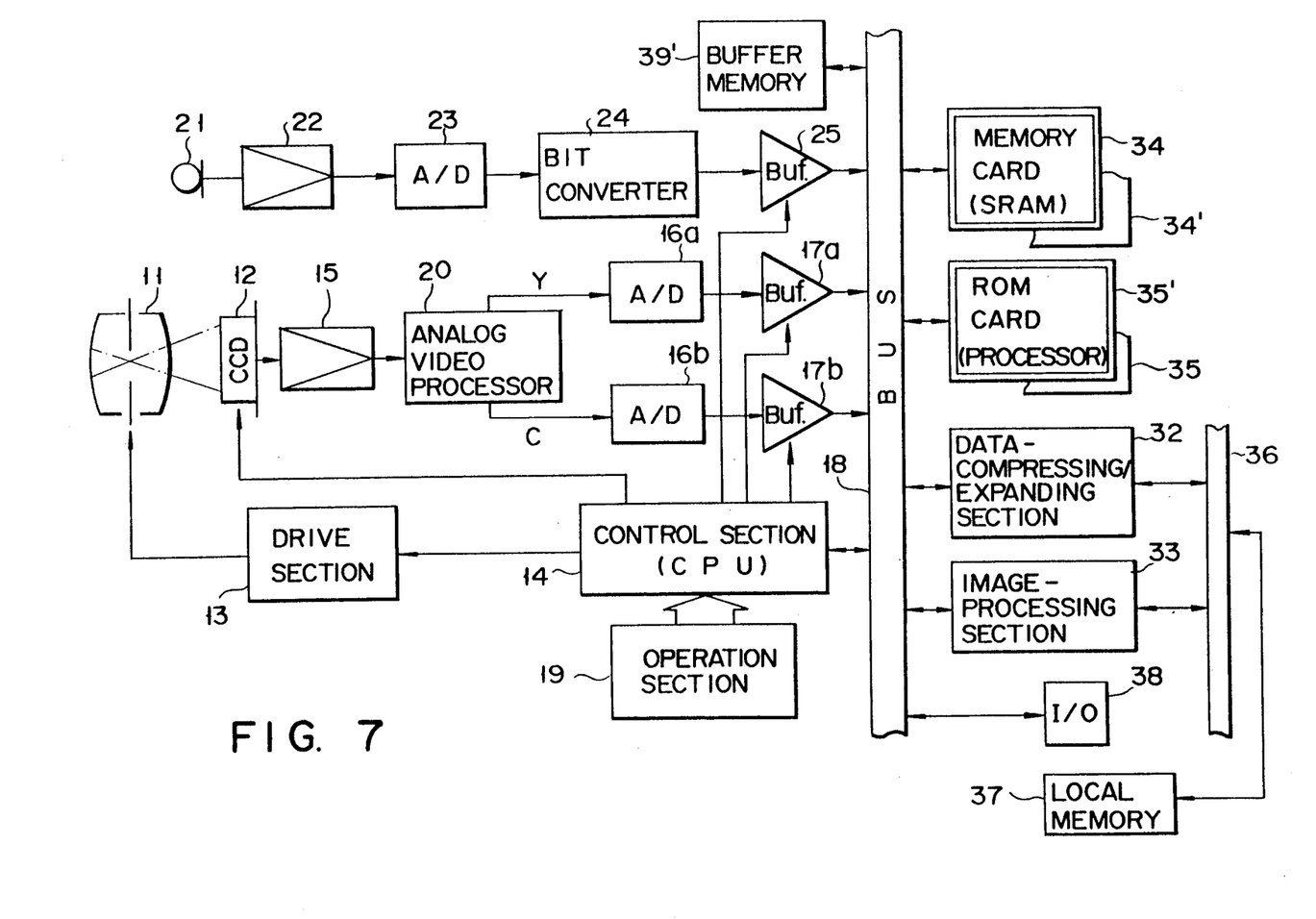
FIG. 7 is a block diagram schematically showing the major components of an electronic still camera according to a second embodiment of the invention.

FIG. 7 shows an electronic still camera according to a second embodiment of the invention. This still camera is different from the camera shown in FIG. 1, in that the still-image signals produced by the CCD 12 are separated into a luminance signal and a chrominance signal before they are converted into digital signals. More specifically, a video processor 20 connected to the output of the amplifier 15 separates each still-image signal, in real time, into a luminance signal Y and a chrominance signal C. This Y-C separation is an analog signal processing which can be accomplished within a relatively short time. The luminance signal Y is converted into a digital signal by an A/D converter 16a, whereas the chrominance signal is converted into a digital signal by an A/D converter 16b. The digital signals output by the A/D converters 16a and 16b are supplied to a memory card 34 through gate circuits 17a and 17b and a common bus line 18, and are stored into the memory card 34. The image signals stored in the memory card 34 are subjected to high-level processing, such as data compression, while the still camera remains in non-photographing condition. Therefore, in the second embodiment (FIG. 7), too, the still-image signals can be recorded in the memory card 34 with high efficiency.

Only one memory card, i.e., the memory card 34, may be used in the second embodiment, instead of two. If this is the case, a buffer memory 39' having a capacity for storing one frame of image data should be connected to the common bus line 18 as is illustrated in FIG. 7, and is used to store still-image signals after the memory card 34 has become full. After some signals are read from the memory card 34 and processed by the processor 31, the section 32 or the section 33 into a smaller amount of data, and this data is stored into the memory card 34, the signals stored in the buffer memory 39' are read out, processed, and stored into the memory card 34 now having a vacant memory area. Obviously, the buffer memory 39' helps the sole memory card 34 to operate at full capacity, that is, to store as much data it can.

As is shown in FIG. 7, the second embodiment has an I/O port 38 connected to the common bus line 18. An external device may be connected to the I/O port 38, in which case the still-image signals stored in the memory card 34, also coupled to the line 18, can be supplied to the external device via the I/O port 38, or the processed signals can also be supplied the processor 31 and the sections 32 and 33 to the external device via the I/O port 38.

If necessary, a processor 35' can be connected to the common bus line 18, which is designed to reproduce images from the signals stored in the memory card 34. The image-reproducing processor 35' can get digital image signals from the I/O port 38 and converts these signals into video signals from which a TV receiver can reproduce and display a still image. If this processor is connected to the common bus line 18, the image-reproduction system incorporated in the still camera can be one of very simple structure.

The present invention is not limited to the embodiments described above. For example, more or fewer memory cards can be used, and each memory card used may have a greater or smaller storage capacity, than in the embodiments shown in FIGS. 1 and 7 in the electronic still camera. Further, the still-image signals read from the memory card 34 can be processed in a way which is different from that described above, or can be subjected to any processing other than those specified above. Moreover, a personal computer can be connected to the I/O port 38, so that the image signals can be processed by means of the personal computer. Still further, a device for checking the digital-processing performed by the processor 31 and the sections 32 and 33 can be connected to the common bus line 18.

As has been described, according to the present invention, the memory card set in the electronic still camera and used to store still-image signals is utilized as a buffer memory. More specifically, as the camera performs photographing operation, the image signals are stored into the memory card; while the camera remains in a non-photographing condition, these signals are read from the memory card, processed (for example, compressed), and stored into the memory card. Since the memory card is used as a buffer memory in this specific manner, the camera need not have a complex hardware configuration and can yet produce and record high-quality image signals.

Furthermore, various signal-processing devices can be connected to the common bus line. In this this case, the image signals read from the memory card can be processed in various ways, and the electronic still camera can be versatile, can be easily operated, and can be practically useful.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An electronic still camera comprising:
   image-pickup means for controllably generating still-image signals;
   A/D conversion means for converting signals corresponding to said still image signals generated by said image-pickup means into digital signals, and including an output;
   image-signal processing means for performing predetermined processing on said digital signals converted by said A/D conversion means, and including an input and an output;
   recording means, comprising a recording medium which is detachably provided on a camera body, for temporarily storing said digital signals converted by said A/D conversion means and selectively storing processed digital signals from said image signal processing means, and including an input portion and an output portion;
   control means for retrieving said digital signals temporarily stored in said recording means during a non-operation period of said image-pickup means and supplying the retrieved digital signals from the output portion of said recording means to the input of said image-signal processing means and, after said predetermined processing has been performed on the retrieved digital signals, supplying the processed digital signals from the output of said image-signal processing means to the input portion of said recording means; and
   a common bus line coupled o the output of said A/D conversion means, the input and output portion of said recording means, and the input and output of said image-signal processing means.

2. The electronic still camera of claim 1, further comprising a local memory means, a local bus line coupled to said local memory means and said image-signal processing means, and means for transferring said digital signals to, and the processed digital signals from, said image-signal processing means in cooperation with said local memory means and independently of transfer of said digital signals and said processed digital signals on said common bus line, for assisting said image-signal processing means to perform said predetermined processing.

3. The electronic still camera of claim 1, wherein said recording means comprises a single memory card on which both the digital signals and said processed digital signals are recorded.

4. The electronic still camera of claim 3, further comprising a buffer memory means coupled to said common bus line and having a storage capacity of at least one frame for recording said digital signals if the storage capacity of said single memory card is exceeded, and wherein said control means activates retrieval of digital signals recorded in said buffer memory means to provide the retrieved digital signals to said image-signal processing means.

5. The electronic still camera of claim 1, wherein said recording means comprises a first memory card and a second memory card, said input portion of the recording means including respective inputs of said first and second memory cards, and said output portion of said recording means including respective outputs of said first and second memory cards;

wherein said digital signals are provided to the input of said first memory card, and said processed digital signals are provided to the input of said second memory card.

6. The electronic still camera according to claim 1, wherein said image-signal processing means includes a digital video processor means for performing at least signal-separating processing on the digital signals, thereby to separate each of the digital signals into a luminance signal and a chrominance signal.

7. The electronic still camera according to claim 6, wherein said image-signal processing means includes an image processing means for performing at least distortion-eliminating processing on the luminance signals and chrominance signals obtained by said digital video processor.

8. The electronic still camera according to claim 3, wherein said single memory card comprises a static random access memory as a main component.

9. The electronic still camera according to claim 5, wherein one of said first and second memory cards comprises a static random access memory as a main component, and the other memory card comprises an electrically erasable programmable read only memory as a main component.

10. The electronic still camera according to claim 5, wherein said first and second memory cards are used at the same time.

11. The electronic still camera of claim 3, further comprising a processor means of the same size as said memory card and coupled to said common bus line for reproducing images from the processed digital signals recorded in said memory card.

12. The electronic still camera of claim 1, further comprising signal separating means to separate each of the still image signals into a luminance signal and a chrominance signal, and to provide said luminance and chrominance signals to said A/D conversion means.

13. The electronic still camera according to claim 6, wherein said digital video processor includes a ROM storing a coefficient value for each of a plurality of image processing, arithmetic operation means for performing an arithmetic operation on the basis of said coefficient value in the ROM and an image signal, and control means for controlling the arithmetic operation by said arithmetic operation means.

* * * * *

UNITED STATES PATENT AND TRADEMARK OFFICE
CERTIFICATE OF CORRECTION

PATENT NO. : 5,153,730
DATED : October 6 1992
INVENTOR(S) : NAGASAKI et al It is certified that error appears in the above-identified patent and that said Letters Patent is hereby corrected as shown below:

TITLE PAGE, Item [56] References Cited -

Under "U.S. Patent Documents", insert

--4,803,554  1/1989  Pape--

Under "Other Documents", insert

--ADAPTIVE CODING OF MONOCHROME AND COLOR IMAGES, Chen et al, IEEE Transactions on Communications, Vol. Com 25, No.11, November 1977, pgs. 1285-1292

INNOVATIONS, The Olympus Pursuit, Vol.10, No.1, 1991--.

Abstract, line 2, change "and A/D" to read --an A/D--.

Signed and Sealed this

Sixteenth Day of November, 1993

BRUCE LEHMAN

*Attest:*

*Attesting Officer*     Commissioner of Patents and Trademarks